US006805495B2

(12) United States Patent
Yoshikawa et al.

(10) Patent No.: US 6,805,495 B2
(45) Date of Patent: Oct. 19, 2004

(54) OPTICAL COMMUNICATION MODULE

(75) Inventors: Satoshi Yoshikawa, Yokohama (JP); Hiromi Kurashima, Yokohama (JP); Yasushi Fujimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 134 days.

(21) Appl. No.: 10/230,402

(22) Filed: Aug. 29, 2002

(65) Prior Publication Data

US 2003/0044133 A1 Mar. 6, 2003

(30) Foreign Application Priority Data

Aug. 29, 2001 (JP) ....................................... 2001-260318

(51) Int. Cl.[7] .............................. G02B 6/38; G02B 6/36
(52) U.S. Cl. .............................. 385/92; 385/60; 385/88
(58) Field of Search ............................ 385/88, 92, 134

(56) References Cited

U.S. PATENT DOCUMENTS 5,945,688 A * 8/1999 Kasahara et al. ............. 257/81
6,263,137 B1 * 7/2001 Yoneyama et al. ........... 385/49
6,377,742 B1 4/2002 Go
6,550,981 B1 * 4/2003 Yamauchi ..................... 385/88
6,632,027 B1 * 10/2003 Yoshida et al. ............... 385/88
6,668,140 B2 * 12/2003 Tatsuno et al. ............. 398/200
2002/0025123 A1 2/2002 Fujimura et al.

* cited by examiner

*Primary Examiner*—John D. Lee
*Assistant Examiner*—Tina M Lin
(74) *Attorney, Agent, or Firm*—McDermott Will & Emery LLP

(57) ABSTRACT

The present invention provides an optical module in which the level of the lead frame coincides with the optical axis of the fiber. The module 1 comprises a container 4, a subassembly 2, a base member 5 and a lead frame 6. The subassembly 2 includes a substrate, on which the semiconductor optical device and the optical fiber are mounted. The container 4 has a pair of surface. One surface is securing the lead frame thereon while the base member is attached to the other surface of the container 4. The base member comprises an island portion and a frame portion. The subassembly 2 is placed on the island and the frame portion is fixed to the container 4. Island support portions connecting the island portion to the frame portion is deformed in the molding process, thus aligning the subassembly 2.

12 Claims, 16 Drawing Sheets

Fig. 15(a)
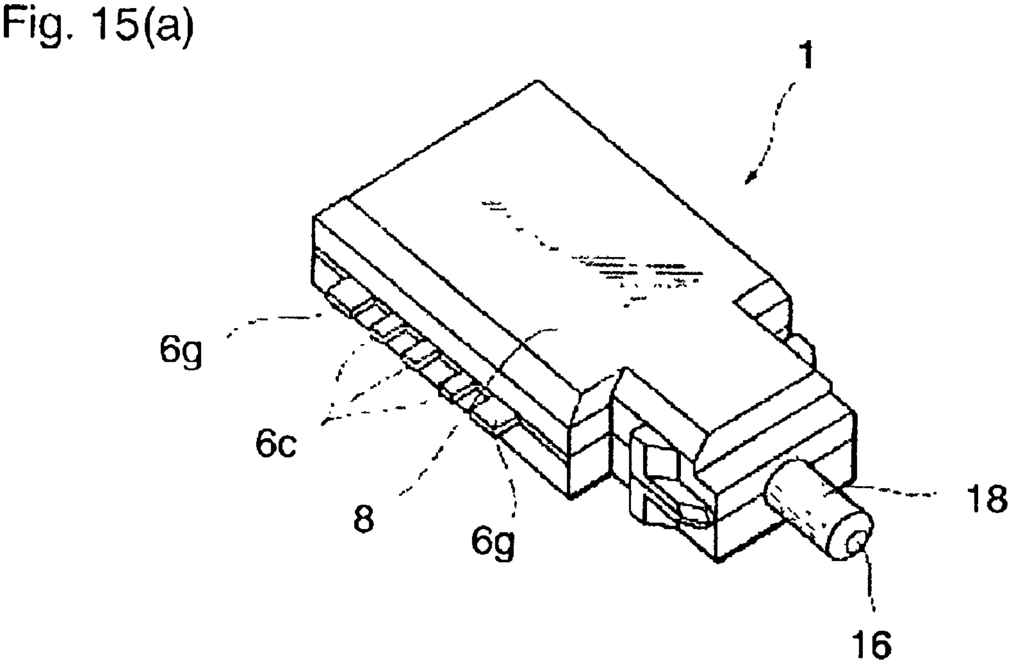
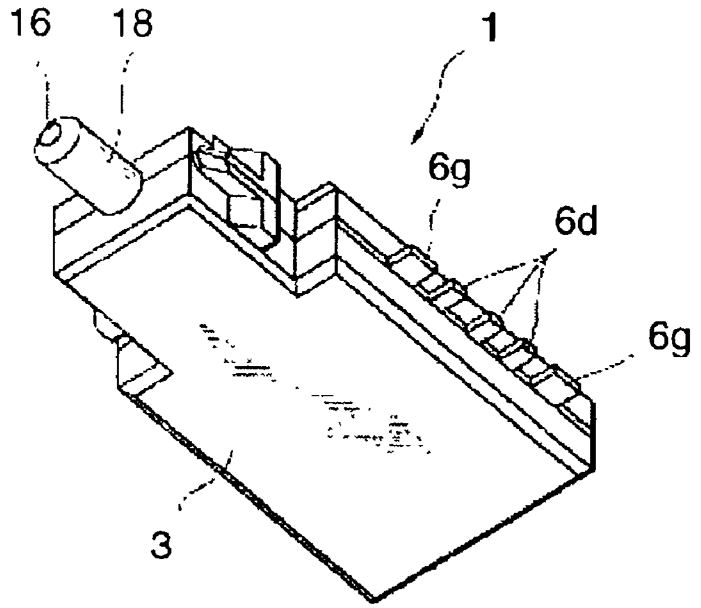
Fig. 15(b)

OPTICAL COMMUNICATION MODULE

CROSS REFERENCE RELATED APPLICATIONS

This application contains subject matter that is related to the subject matter of the following application, reference number 102192-US-00 (Ishiguro), which is assigned to the same assignee as this application and filed on the same day as this application. The below listed application is hereby incorporated herein by reference in its entirely: "Optical Communication Module" by Yoshikawa et al.

BACKGROUND OF THE INVENTION

1. Field of the Invention

This invention relates to an optical communication module.

2. Related Prior Art

An optical communication module includes an optical semiconductor device, a lead frame and a substrate disposing the semiconductor device and an optical fiber thereon. The optical coupling between the semiconductor device and the optical fiber is realized on the substrate and the substrate is secured on an island of the lead frame. Such optical module is disclosed in the U.S. Pat. No. 6,377,742.

In the conventional module shown in U.S. Pat. No. 6,377,742, however, it would be preferable for the manufacturing of the module that the level of the primary surface of the lead frame corresponds with that of the substrate.

SUMMARY OF THE INVENTION

The object of the present invention is to provide an optical communication module with a new configuration, in which the level of the lead frame and that of the substrate coincide to each other.

An optical module according to the present invention comprises a subassembly, a container, a lead frame fixed to the container, and a base member. The subassembly secures a semiconductor optical device and an optical fiber coupled to the semiconductor device. The base member supports the subassembly. The container comprises a pair of side portion extending along a first direction and a rear portion extending along a second direction intersecting the first direction. The device-mounted area is provided on the rear portion.

The lead frame is fixed to a first surface of the container, while the base member is fixed to a second surface opposing to the first surface. The pair of side portions of the container and the base member forms a room for securing the subassembly therein. According to the present configuration, the optical axis of the optical fiber enables to set substantially within the primary surface of the lead frame by adjusting the level of the base member. The container has a plurality of first regions on the first surface and second regions on the second surface. The lead frame is fixed to first regions, while the base member is attached to second regions.

The base member comprises a pair of frame portion, an island portion and a plurality of supporting portions. The frame portions extend along the first direction within a surface of the base member. The island portion is provided between the respective frame portions within the surface. The island portion holds the subassembly thereon. Respective supporting portions have at least a section, a thickness of which is thinner than the island portion. Thus, the supporting portion is easy to deform.

Further aspect of the invention is that the lead frame comprises a pair of fixing bar and a plurality of leads.

Respective bars extend along the first direction and correspond to regions on the container, while a plurality of leads are along the second direction, hence tips of leads face to fixing bars.

The module is preferable to provide housing for covering the subassembly, the container and the lead frame. The housing may be made of a mold resin. The subassembly includes a ferrule for securing the fiber. The ferrule and leads protrude from the housing, on the other hand the subassembly, the container, and the base member is molded within the resin. The configuration of the present module is applicable to the resin-molded optical module.

The optical device is a light-emitting semiconductor device, such as laser diode or a light-receiving semiconductor device such as photo diode.

BRIEF DESCRIPTION OF DRAWINGS

FIG. 15(*a*) and FIG. 15(*b*) show the complete product of the invention, which is resin molded;

DETAILED DESCRIPTION OF THE PREFERRED EMBODIMENTS

The preferred embodiments and the manufacturing method of the optical module according to the present invention will be described in referring to drawings.

First Embodiment

Figure 1:
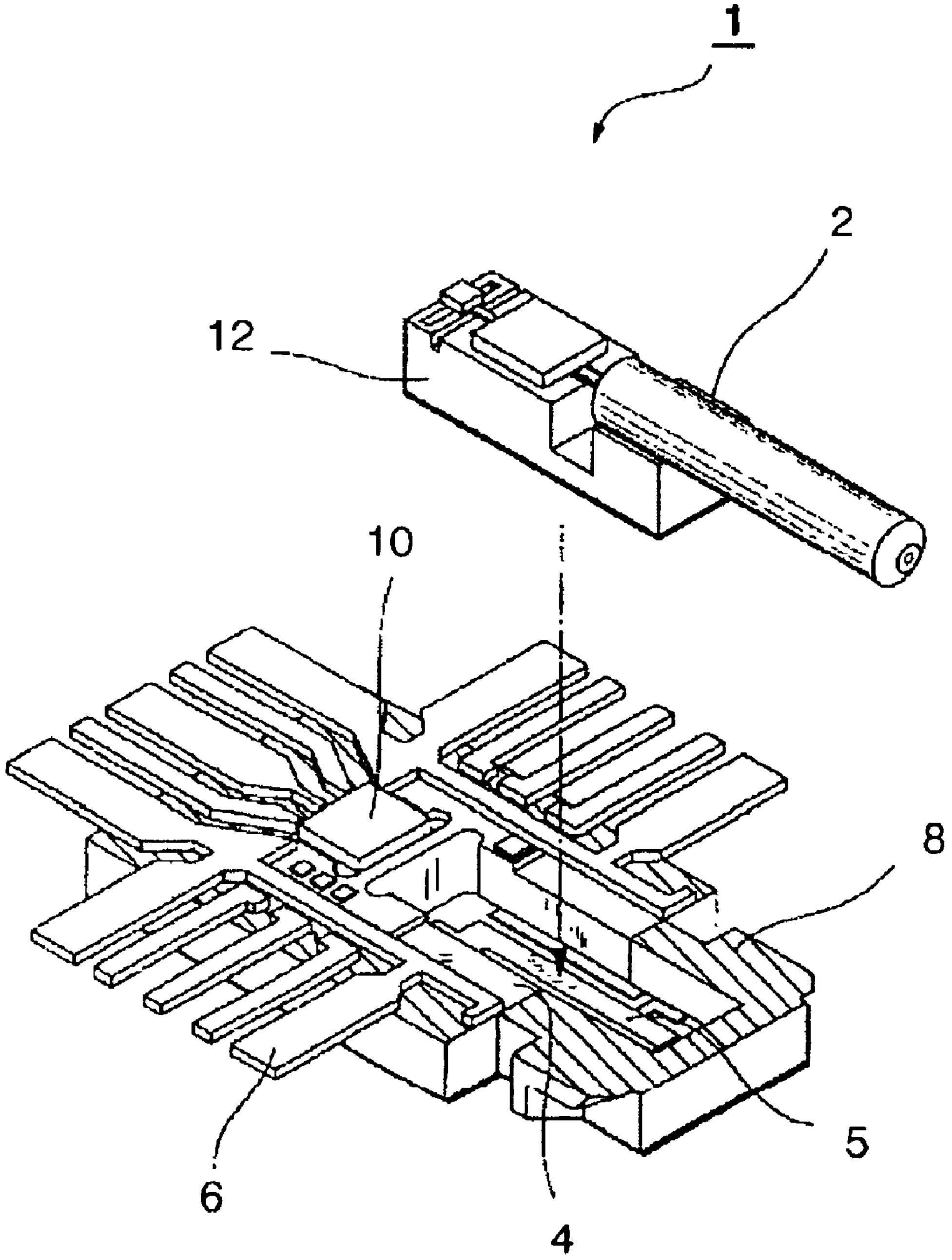
FIG. 1 is a view showing the optical module according to the present invention.

FIG. 1 shows the optical module of the present invention. The module 1 comprises a subassembly 2, a container 4, a lead frame 6, a base member 5, and housing 8. In the present embodiment, the housing 8 is a resin-molded, in which the subassembly 2, the container 4, the base member 5 and the lead frame 6 are encapsulated. One of electrical and optical signal is converted to the other by the subassembly 2. The container 4 includes a signal processing circuit 10 on a device-mounted area. In the case of the light-receiving module, the signal processing circuit 10 amplifies the electrical signal from the light-receiving device. On the other hand, the circuit 10 drives the light-emitting device, such as a laser diode, in the case of the light-emitting module. The base member 5 is fixed to one surface of the container 4, while the lead frame is arranged to the other surface of the container 4. On an island of the base member 5 secures the subassembly. FIG. 1 is a cutaway viewing to show the inside of the housing 8. The subassembly 2 is set along the arrows in the figure and placed on the base member 5 within the housing 8.

Figure 2A:
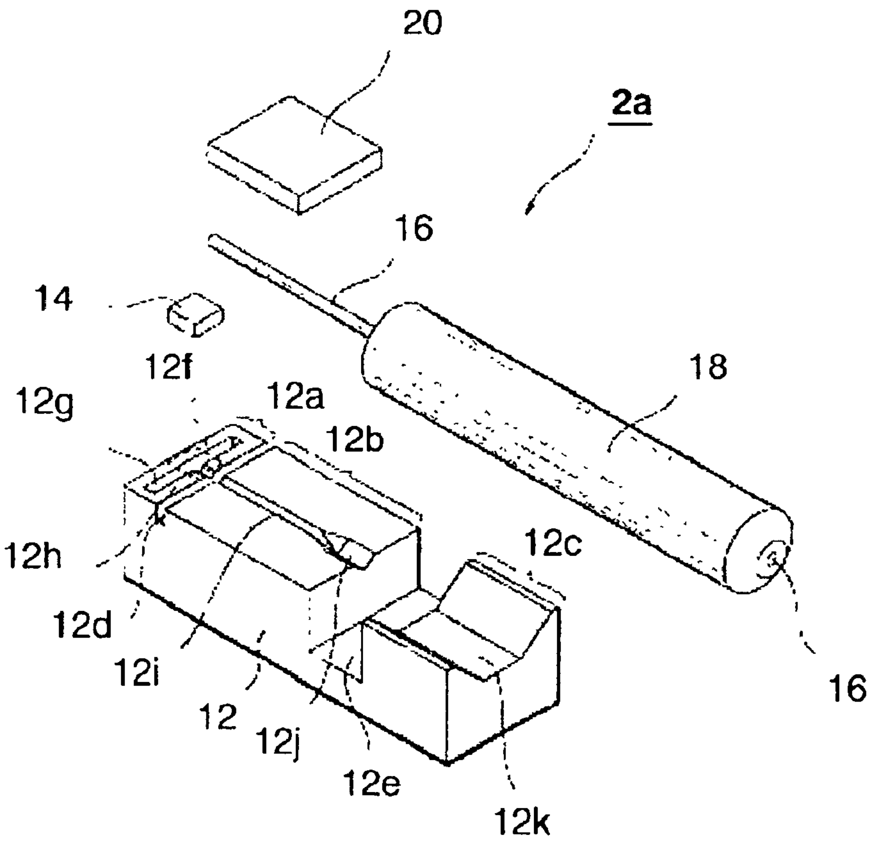
FIG. 2(*a*) and FIG. 2(*b*) show the subassembly of the module.
Figure 2B:
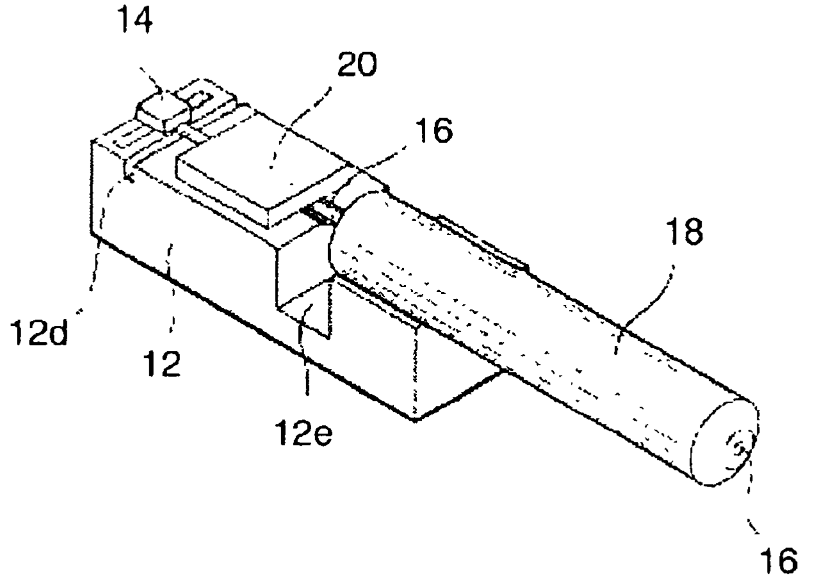

FIG. 2(*a*) and FIG. 2(*b*) show the subassembly 2*a*. The subassembly 2*a* includes a substrate, a light-receiving device 14, an optical fiber 16, a ferrule 18 and a supplementary member 20. The substrate 12 comprises a first region 12*a*, a second region 12*b* and a third region 12*c*, each of which are along an optical axis of the fiber 16. The slot 12*d* between the first and second regions (12*a*, 12*b*) has a fiber-abutted surface. This surface defines the tip position of the fiber. The another slot 12*e* is provided between the second region and the third region (12*b*, 12*c*). The first region 12*a* includes an optical device-mounted area 12*f* and a slot 12*g*. The slot 12*g* intersects the optical axis of the fiber and a slot 12*h*. The light emitted from the fiber 16 is guided into the slot 12*h*, reflected at one surface of the slot 12*h*, and finally entered into the semiconductor device 14. The second region 12*b* provides another slot 12*i* for securing the fiber by two surfaces. Another slot 12*j* in the second region is for releasing mechanical stress from the fiber 16. The third region includes another slot 12*k* for support the ferrule 18 therein. Typical cross section of slots 12*i* and 12*k* are V-shaped and trapezoid, respectively.

The substrate 12 mounts the optical device 14, the optical fiber 16 and the ferrule 18 thereon. The device 14 is optically coupled to one tip of the fiber. Another tip of the fiber is exposed on the one facet of the ferrule. The supplementary member 20 fixes the fiber to the substrate.

Figure 3A:
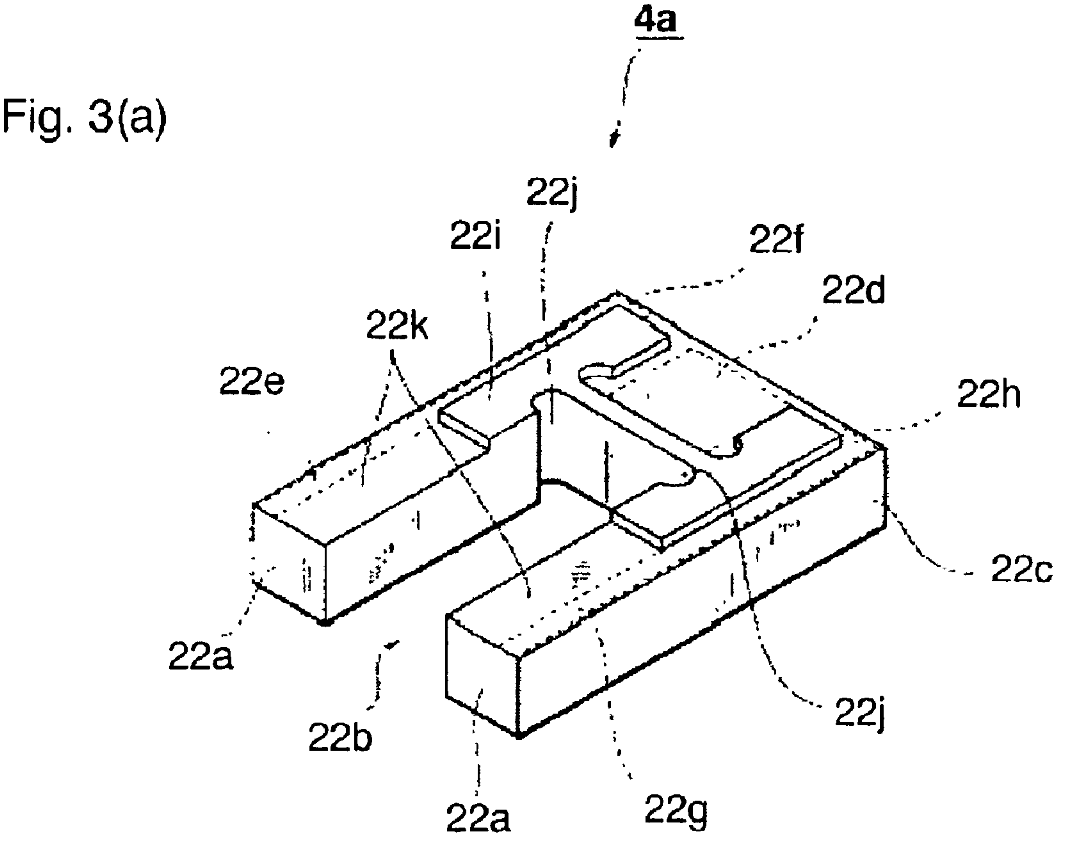
FIG. 3(*a*) and FIG. 3(*b*) show one type of the container of the invention.
Figure 3B:
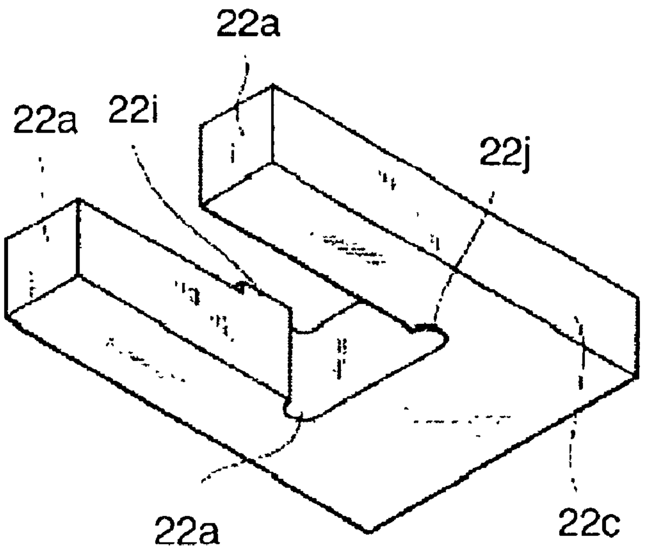

FIG. 3(*a*) and FIG. 3(*b*) are views showing one type of the container. The container 4*a* comprises a pair of side portion 22*a* and a rear portion 22*c*. The container 4 is preferable to be made of metal. The side portions 22*a* extend along a first direction so as to define a room 22*b* for securing the subassembly therebetween. The rear portion extends along a second direction intersecting the first direction and connects respective side portions. On the rear portion provides a device-mounted area 22*d*. The device-mounted area 22*d* is next to the room 22*b*. The container includes regions from 22*e* to 22*h* for fixing the lead frame thereto. Regions 22*e* and 22*g* are on respective edges of the side portion 22*a*, while regions 22*f* and 22*h* are on the edge of the rear portion. Regions from 22*e* to 22*h* surround a projection 22*i*, which is used as an alignment guide for the lead frame 6.

The interval between respective side portions 22*a* is slightly wider than the width of the substrate 12. Bores 22*j* are provided at the corner between respective side portions 22*a* and the rear portion 22*c*, which enable to spread the excess resin or adhesive.

Figure 4:
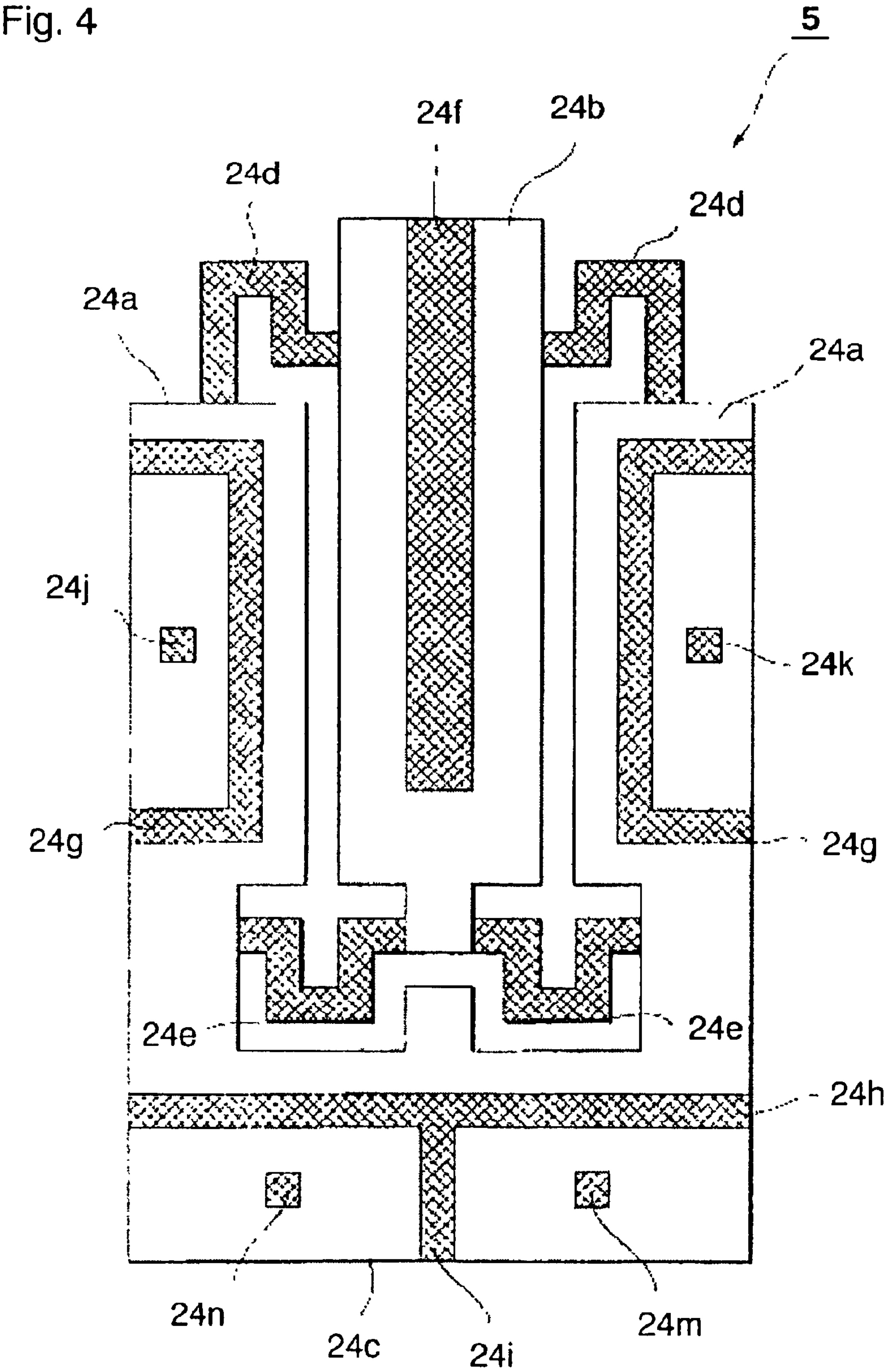
FIG. 4 shows one type of the base member.

FIG. 4 is a plane view of the base member 5. The member is used for securing the substrate 12 of the subassembly 2 thereto. The base member includes a pair of frame portion 24*a*, an island portion 24*b*, and a plurality of supporting portion 24*d* and 24*e*. The support portion connects the frame portion to the island portion.

The pair of frame portion extends along the first direction so as to be fixed to respective side members of the container 4. The island portion extends along the first direction for holding the substrate 12. A portion 24*c* extending along the second direction connects respective frame portions. It is preferable for support portions to have flexibility and elasticity because, when securing the substrate, the optical axis of the fiber corresponds with the upper surface of the substrate by displacing the island portion. Support portions have at least a section, a thickness of which is thinner than that of the island portion. Such sections are denoted by crosshatched area in FIG. 4. Further, the support portion 24*d* and 24*e* is preferable to have some corners. Although the support portions 24*d* and 24*e* connect the island portion 24*b* to the frame portion 24*a* in FIG. 4, it would be easily understood for ordinal persons that the connecting the island portion to the other portion 24*c* is also applicable.

In FIG. 4, the edge of the island portion 24*b* extends over the edge of the frame portion 24*a*. The support portion 24*d* connects this edge of the island portion 24*b* to the edge of the frame portion 24*a* with some corners. The direction of extending the island portion is different from the direction to bring out the support portion. This configuration facilitates the displacement of the island portion 24*b*.

The area of the island portion 24*b* is enough to secure the subassembly 2 thereon, while the size of the frame portion 24*a* is determined by the necessity for fixing rigidly the container 4 thereto. The support portion 24*e* also connects the edge of the island 24*b* to the edge of the frame portion 24*a*.

Figure 5A:
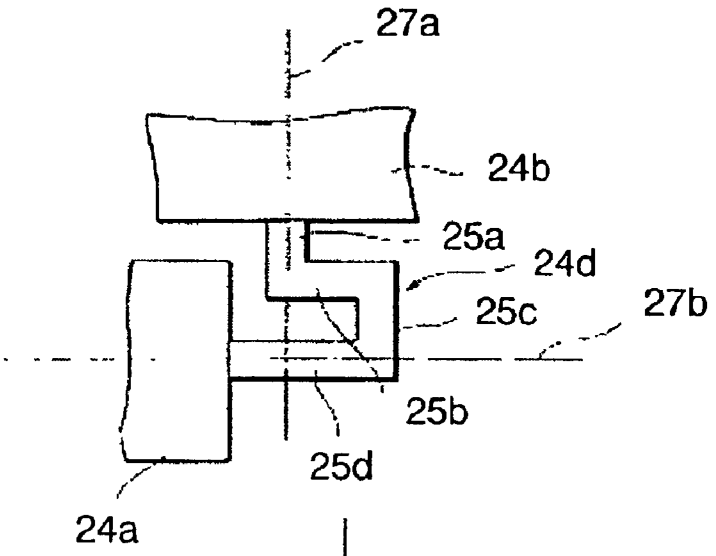
FIG. 5(*a*) and FIG. 5(*b*) show support portions of the base member.
Figure 5B:
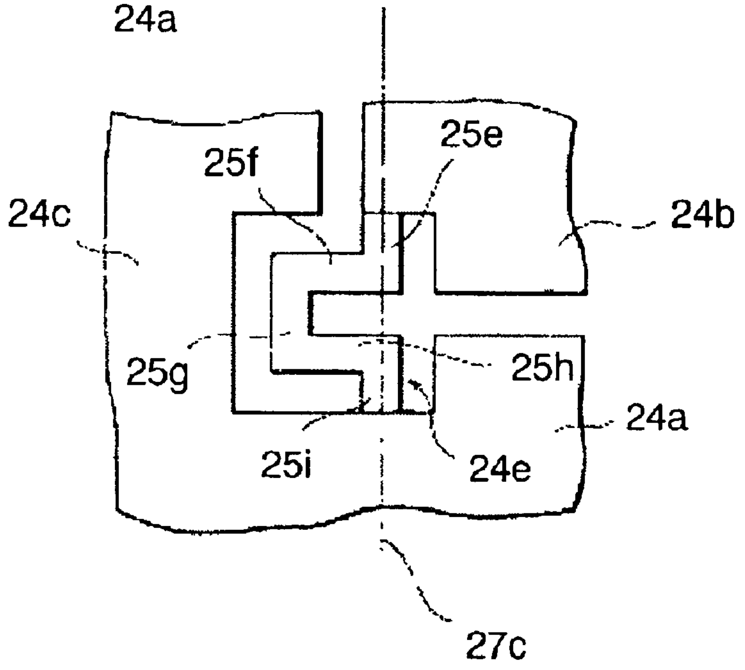

FIG. 5(*a*) and FIG. 5(*b*) are views of support portions 24*d* and 24*e*. In FIG. 5(*a*), the support portion 24*d* has a first, a second, a third and a fourth sections, from 25*a* to 25*d* respectively. The first section 25*a* extends vertically from the island portion 24*b*. The second section 25*b* extends horizontally from the edge of the first section 25*a*. The third section extends vertically from the end of the second section 25*b*. Finally, the fourth section extends horizontally from the end of the third section and reaches to the frame portion 24*a*.

FIG. 5(*b*) shows the support portion 24*e*, which contains a fifth, a sixth, a seventh, a eighth and a ninth sections, from 25*e* to 25*i* respectively. The support portion has a similar configuration to the portion 25*d*. This zigzag shape of the support portion enables the island portion to rotate around a chained axis in FIG. 5. Hence, the island portion readily displaces its original position.

Referring back to FIG. 4, several sections with a thinner thickness are provided in portions 24*a*, 24*b* and 24*c*. The island portion 24*b* also has the section 24*f* extending vertically from the edge. Respective frame portions 24*a* have sections 24*g*, beginning from the outer edge and returning to the same edge after twice turning. Sections 24*h* and 24*i* are in the portion 24*c*. Further, several markers from 24*j* to 24*n* are in frame portions 24*a* and 24*c*. The base member and the subassembly are attached with adhesive as absorbing excess adhesive into these markers.

Figure 6:
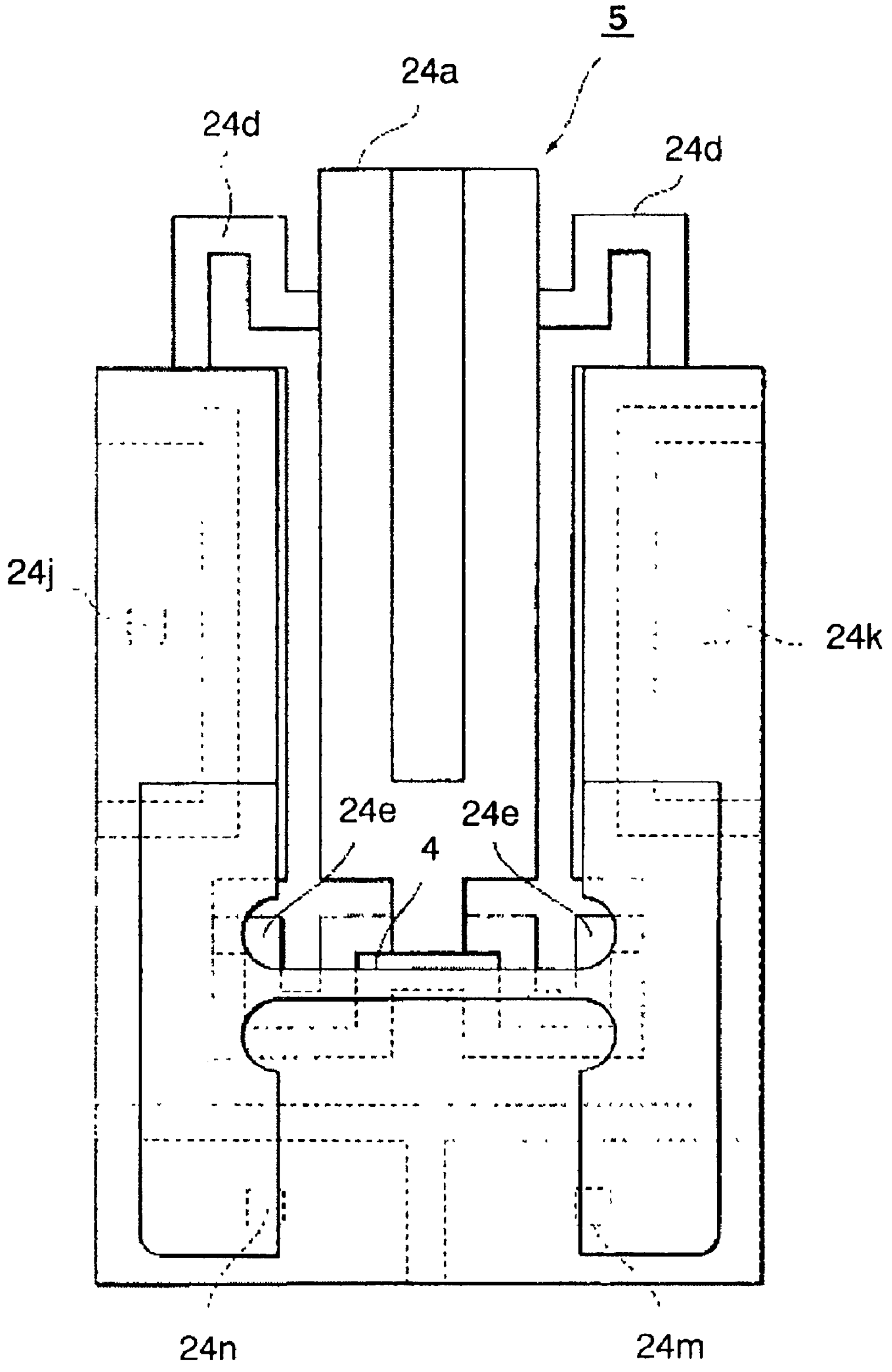
FIG. 6 shows a positional relation of the base member to the container.

FIG. 6 shows a positional relation of the base member 5 to the container 4. The assembling steps are as follows: firstly, a proper amount of adhesive is pasted around markers (24*j* to 24*n*) of the base member. The thinner section prevents the excess adhesive from spreading out and reaching to the support portions 24*d* and 24*e*. Therefore, even if the support portion 24*e* faces the back surface of the container 4, it does not adhere to each other.

Figure 7:
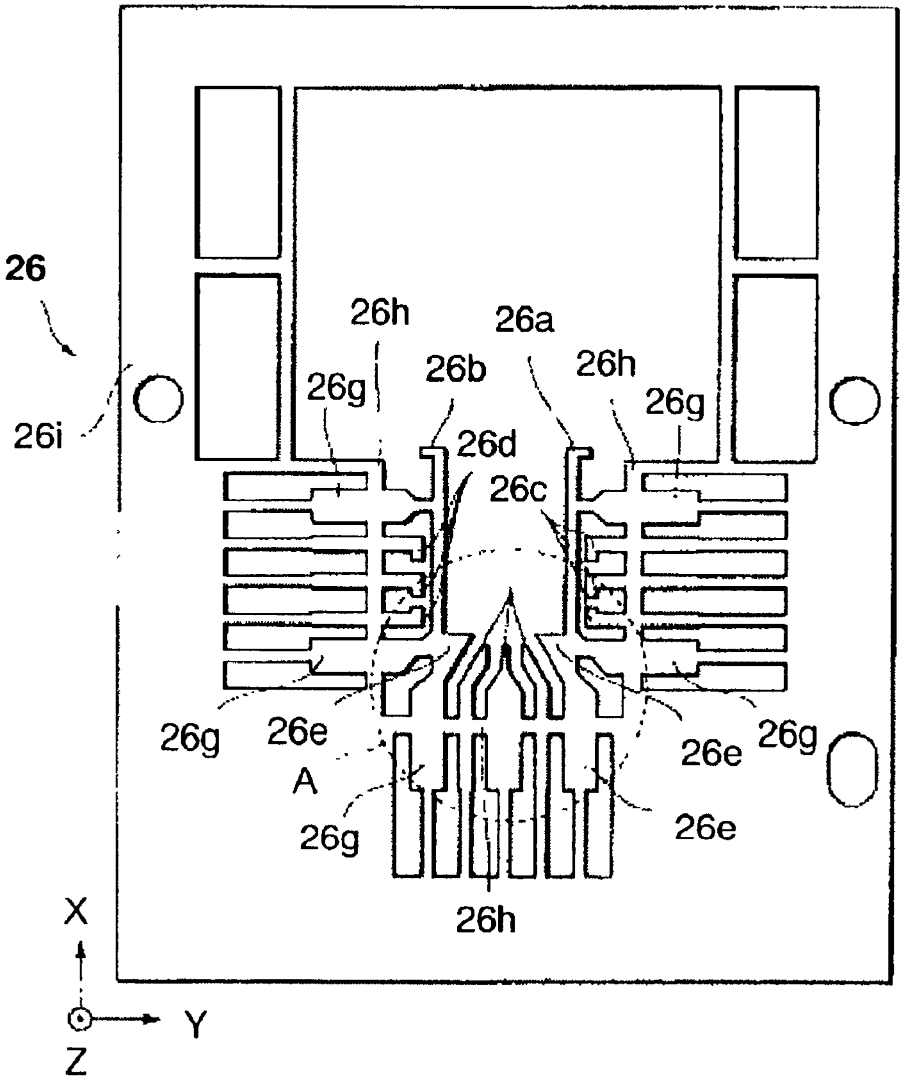
FIG. 7 is a plane view of the lead frame.

FIG. 7 shows a plane view of the lead frame 26. The lead frame 26 includes a pair of first fixing bar (26*a*, 26*b*) to fix the lead frame 26 to regions 22*e* and 22*g* on the container 4, and inner leads (26*c*, 26*d*). The subassembly 2 is placed in the room 22*c* between the fixing bars (26*a*, 26*b*). This arrangement enable for the subassembly to connect electrically to the respective inner leads (26*c*, 26*d*). The lead frame 26 further comprises a second pair of fixing bar 26*e*, another inner leads 26*f* therebetween, and outer leads. An outer frame 26*i* supports the first fixing bars, the second fixing bars, and inner leads through tie bars 26*h*.

Figure 8:
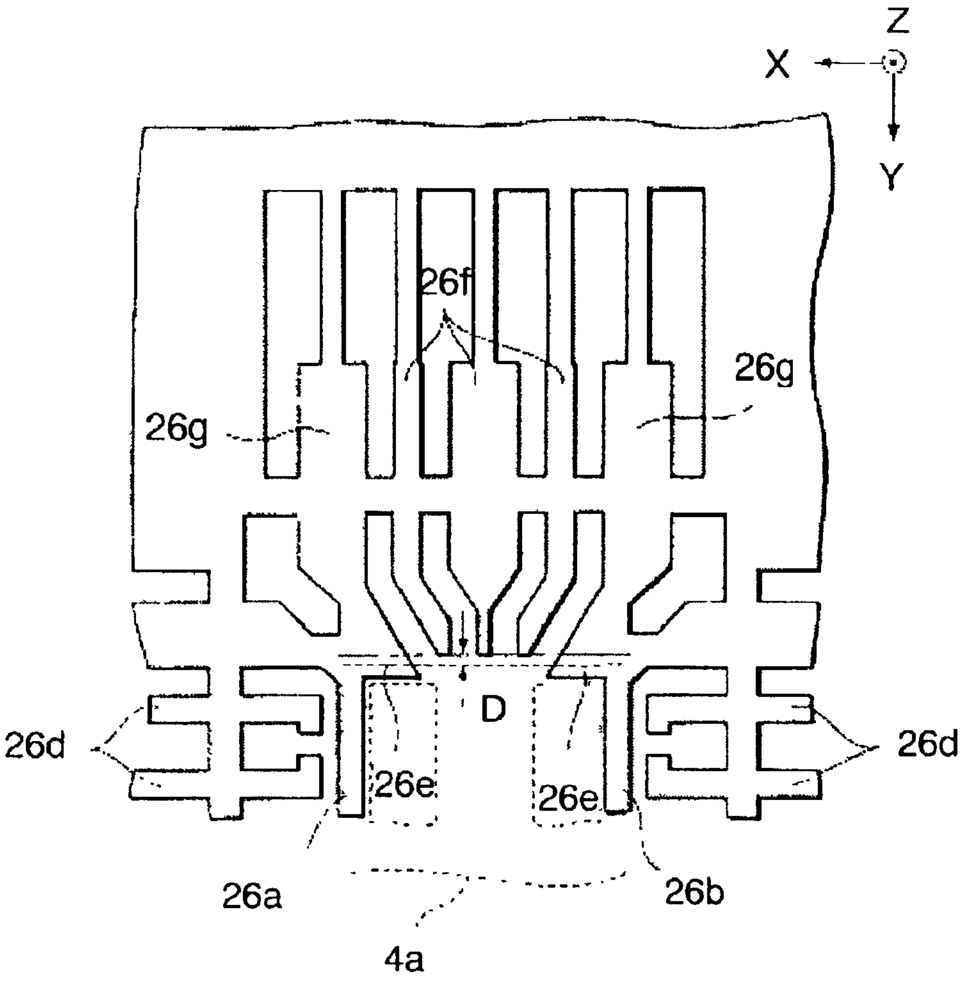
FIG. 8 shows the principal portion of the lead frame.

FIG. 8 is an enlarged view showing a region A circled in FIG. 7. Dotted line in FIG. 8 shows the relative position of the container 4, which is surrounded by a set of fixing bars (26*a*, 26*b*, 26*e*). The tips of inner leads 26*f* are spaced by distance D from the edge of the container 4. Therefore, this configuration enables to arrange the container in the vicinity of the tips of inner lead 26*f* without contacting to them.

Second Embodiment

Figure 9:
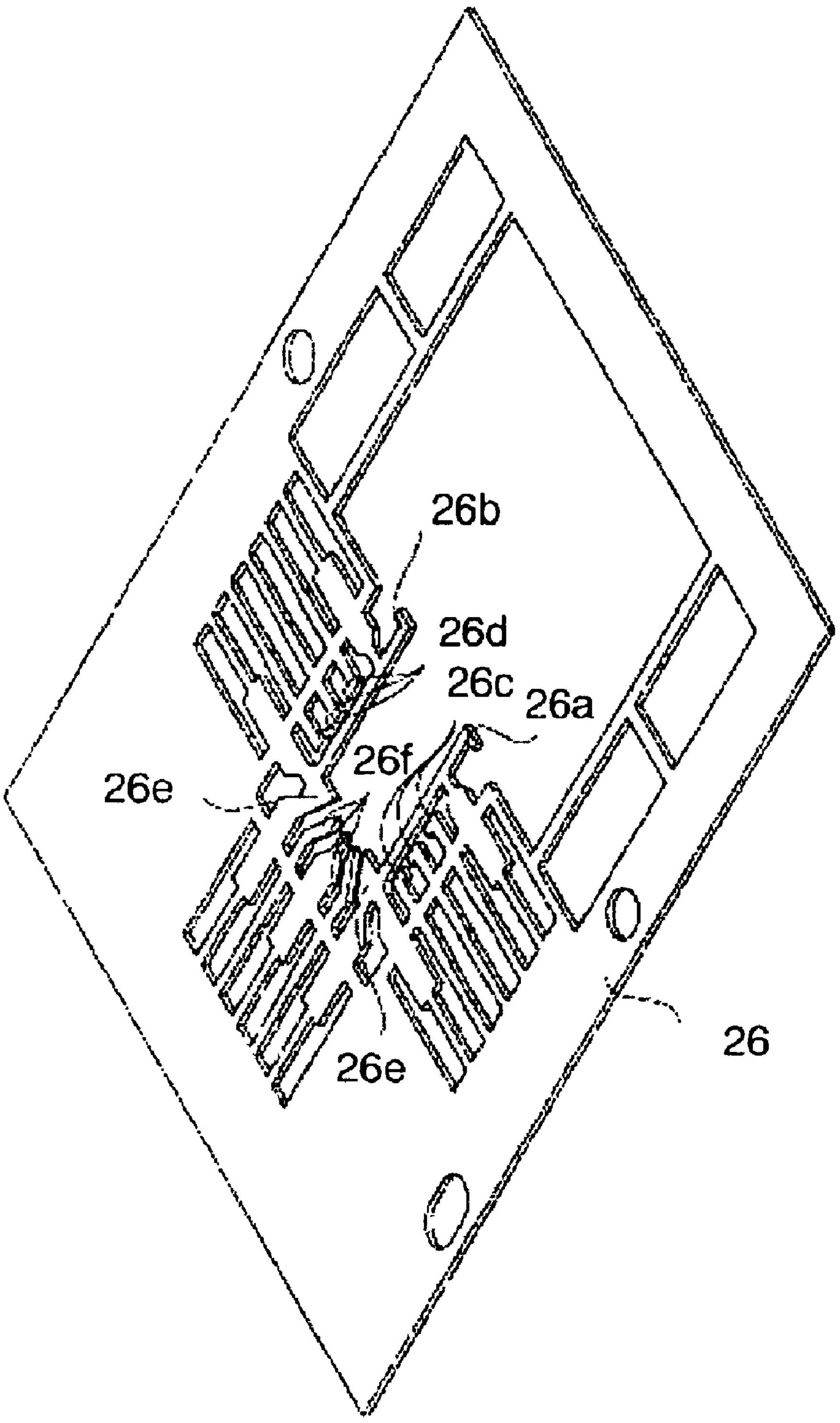
FIG. 9 is a view showing the lead frame.
Figure 10:
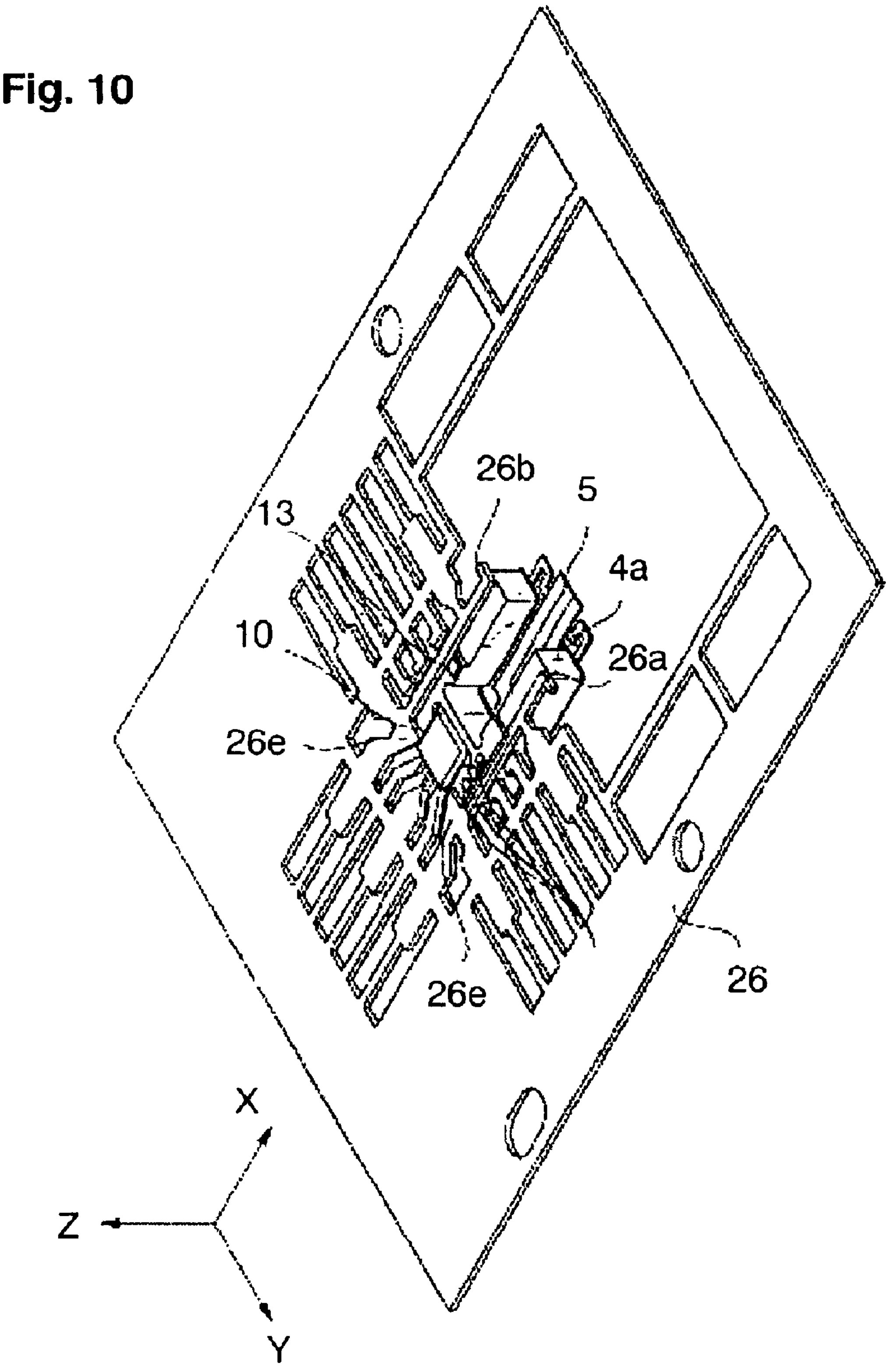
FIG. 10 is a view showing the intermediate product of the invention.

The next is an explanation of the structure of the module referring to the manufacturing process. First, the lead frame 26 and the container 4 with accompanying the base member thereto are provided as shown in FIG. 9 and FIG. 10. FIG. 10 is a view showing an intermediate product after assembling of the container 4 to the lead frame 26. As shown in FIG. 10, after aligning the lead frame 26 to the projection 22*j* on the container 4, respective fixing bars (26*a*, 26*b*, 26*h*) of the lead frame 26 are attached to regions from 22*e* to 24*h* in FIG. 4 of the container. The signal processing circuit 10 and electrical components 11 and 13 are mounted in advance.

Figure 11:
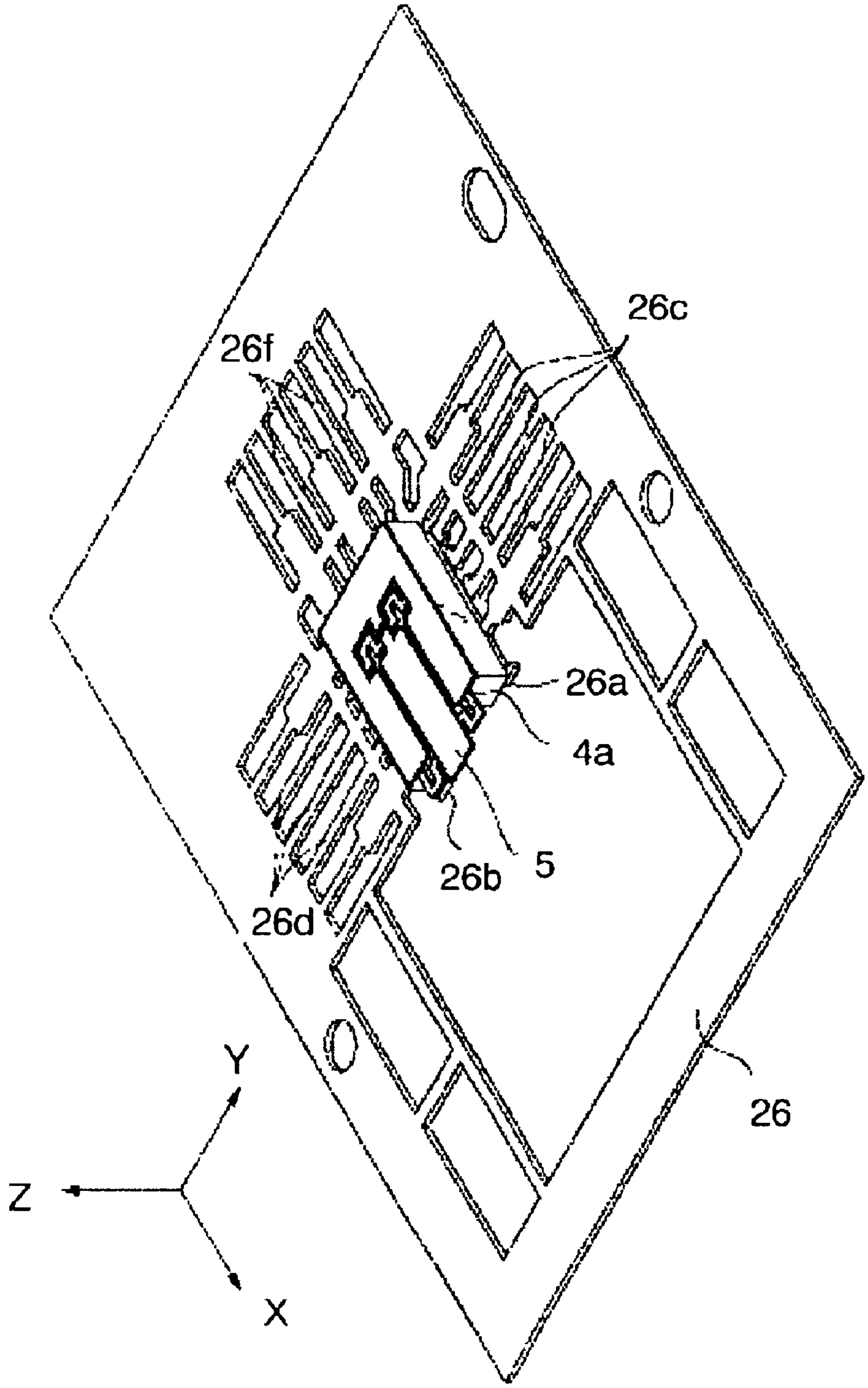
FIG. 11 shows the back view of the intermediate product of the invention.

FIG. 11 shows a back view of the intermediate product of FIG. 10. On the back surface of the container 4 provides the base member 5. As recognized from FIG. 10 and FIG. 11, the lead frame 26 has a set of fixing bar (26*a*, 26*b*, 26*e*) instead of an island shown in the conventional module. Moreover, the set of fixing bar surrounds the container 4. This configuration enables to arrange inner leads around the container 4.

Figure 12:
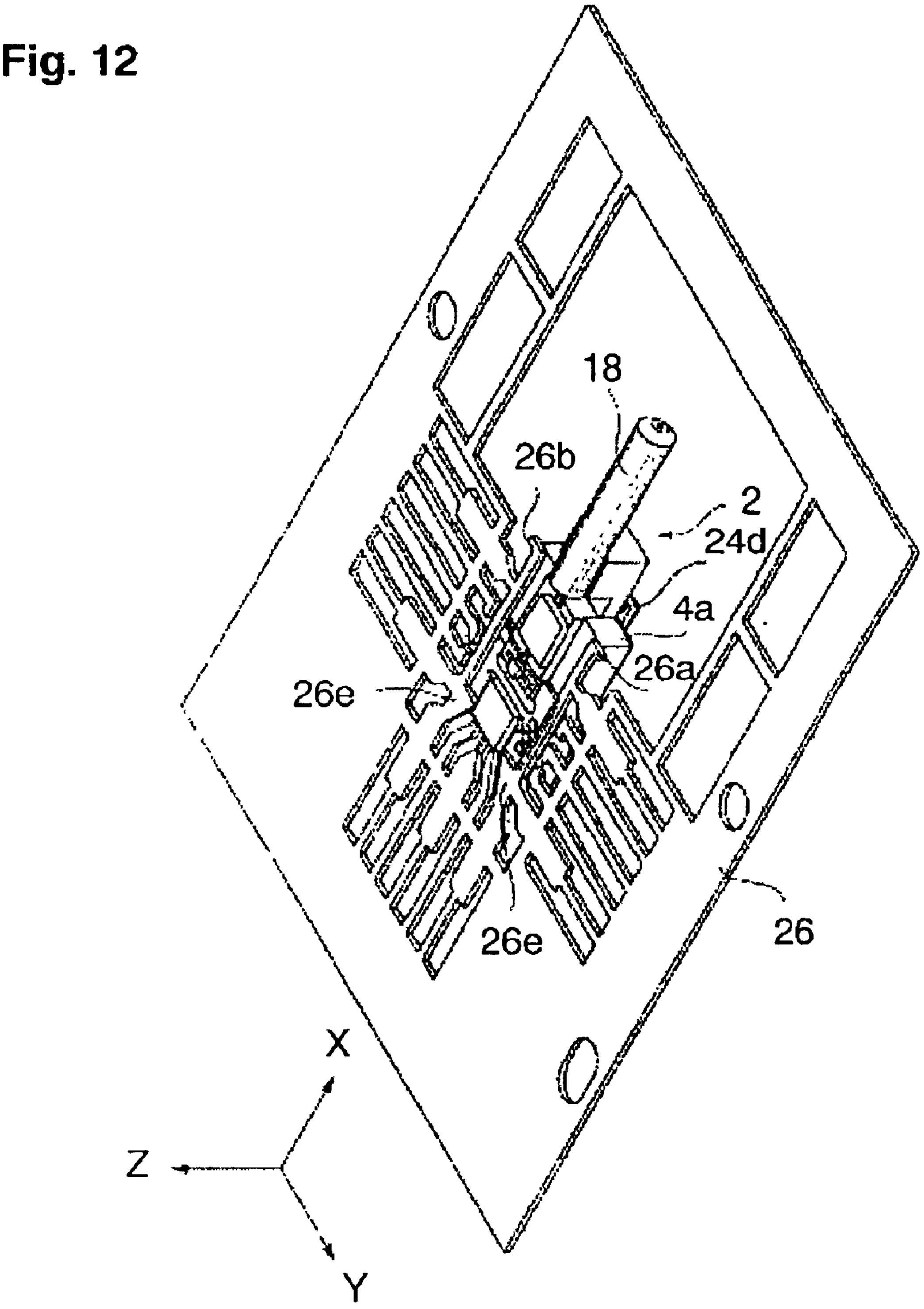
FIG. 12 shows the intermediate product next to that shown in FIG. 11.

In FIG. 12, the subassembly 2 is secured on the base member 5. The substrate 12 of the subassembly 2 is mounted on the island 24*a* of the base member 5; that is, the substrate 12 is fixed to the island 24*a* by a conductive adhesive. Positional adjustment of the subassembly 2 performs the direction of the ferrule 18 to align the X-axis.

After the alignment, the wire bonding performs electrical connections between the subassembly 2 and the lead frame 26. By adjusting the thickness of the substrate 12 to be substantially same as the height of the side portion 22*a* of the container, the level of the primary surface of the lead frame 26 enables to coincide with the primary surface of substrate 12. Thus, the optical axis of the fiber 16 is substantially contained in the hypothetical surface formed by the primary surface of the lead frame 26.

Figure 13:
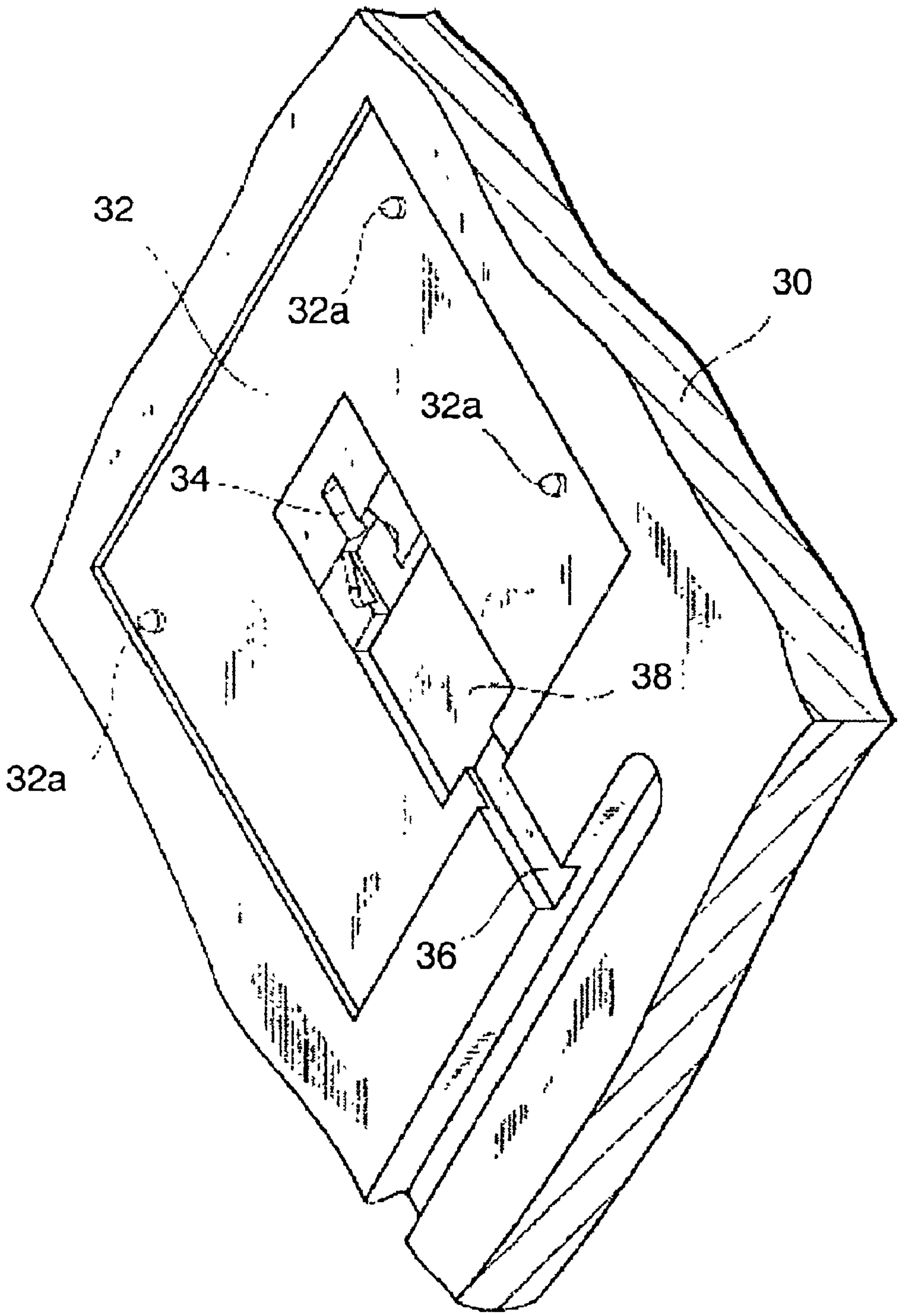
FIG. 13 is a view showing the mold die.

A resin molding using a die shown in FIG. 13 molds intermediate products of FIG. 11 and FIG. 12. The mold die 30 has a plateau 32 for receiving the lead frame 26. Several protrusions from 32*a* to 32*c* are in the plateau for adjusting the position of the lead frame to the die. A depression 34 for receiving the ferrule 18 is in the cavity 38. Once the lead frame is put on the plateau, the ferrule is automatically set in the depression 34. Since the position of the ferrule is aligned to the lead frame 26 through the container 4, unexpected residual stress is released from the housing. After setting the intermediate product to the die, the resin is flown into the cavity 38 through the gate 36.

Figure 14:
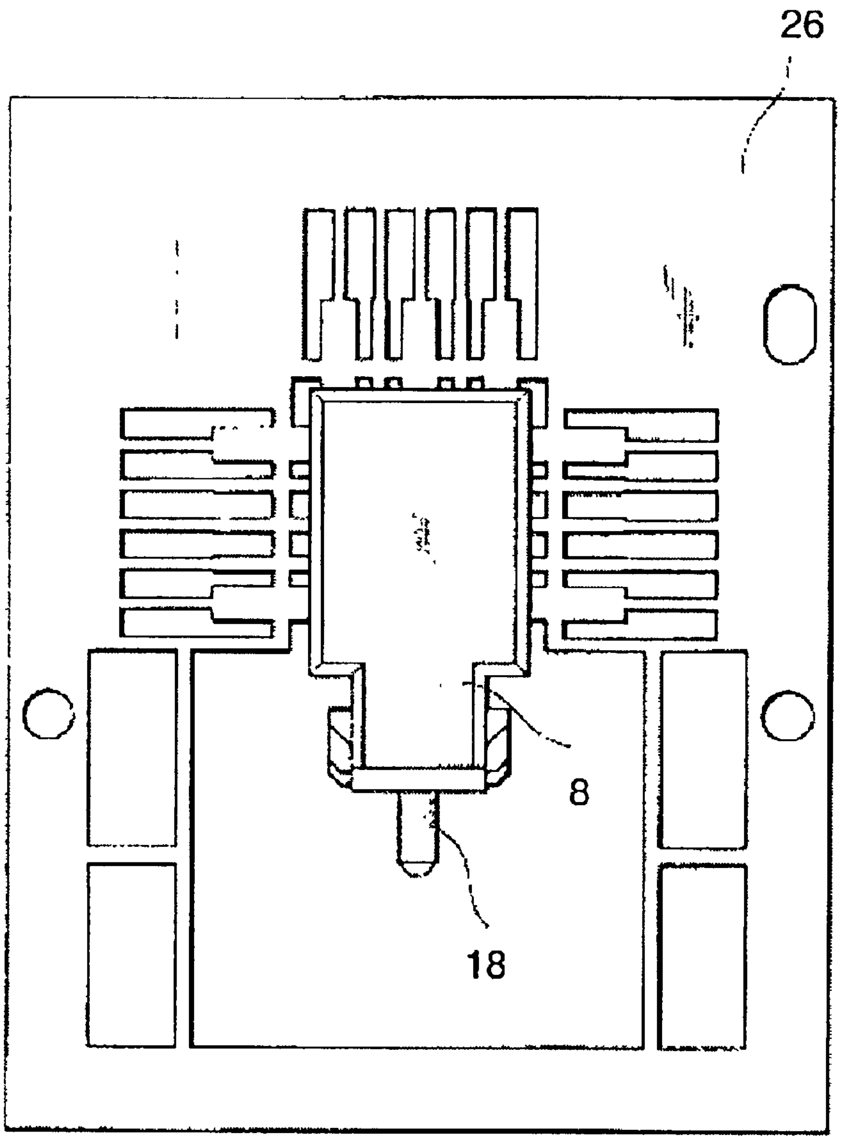
FIG. 14 shows the intermediate product next to that shown in FIG. 12.

FIG. 14 shows the intermediate product after the molding. Tie bars are cut after the molding and outer leads are reformed downwardly if necessary. FIG. 15(*a*) shows an upper view of the final product, while FIG. 15(*b*) is a lower view. A set of leads (6*c*, 6*d*, and 6*f*) protrudes from the side surface of the module. Lead 6*f* is not shown in FIG. 15. The hypothetical surface containing leads substantially coincide with the optical axis of the ferrule. In the module, the ferrule 18 is arranged at the one of the side surface. Both sides of the ferrule 18 provide structures for mating an optical connector thereto.

Third Embodiment

Figures 16A, 16B, 16C:
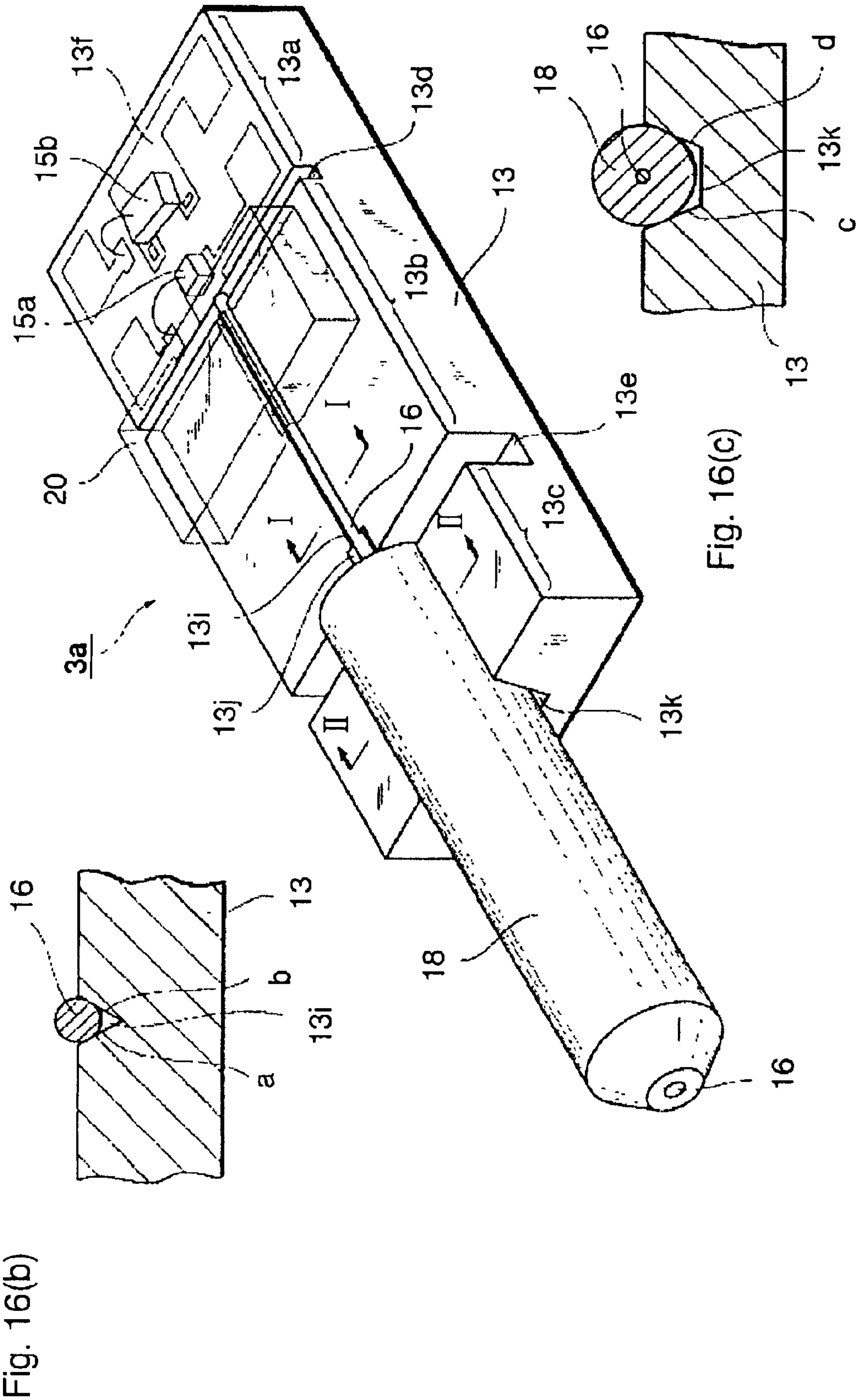
FIG. 16(*a*) is a view showing the subassembly of the light emitting module, FIG. 16(*b*) is a cross-sectional view along I—I in FIG. 16(*a*) and FIG. 16(*c*) is a cross-sectional view along II—II in FIG. 16(*a*).

While embodiment previously described is the light-receiving module in which the semiconductor light-receiving device is contained, the present embodiment is for the light-emitting module as referring FIG. 16.

The subassembly 3 includes a substrate 13, a light-emitting semiconductor device 15, an optical fiber 16, a ferrule 18 and a supplementary member 20. As shown in FIG. 16(*a*), the substrate 13 comprises a first region 13*a*, a second region 13*b* and a third region 13*c*, each of which are along an optical axis of the fiber 16 and arranged in this order. A slot 13*d* between the first region and the second region has a fiber-abutted surface. This surface defines the tip position of the fiber. The first region 13*a* has an area 13*f*, where the light-emitting device 15*a* and a light-monitoring device 15*b* are mounted thereon.

Light emitted from one surface of the device 15*a* enters into the tip of the fiber 16, while light from another surface of the device 15*a* enters into the monitoring device 15*b*, such as a photo diode. The second region 13*b* provides a slot 13*i* for securing the fiber 16 therein by two surfaces of the slot. It is preferable to have another slot 13*j* between the second and the third regions. The third region 13*c* includes another slot 13*k* for supporting the ferrule 18. Typical cross sectional configuration of slots 13*i* and 13*k* are V-shaped and trapezoid, respectively. FIG. 18(*b*) shows the cross-sectional view of the slot 13*i* along I—I line, while FIG. 18(*c*) shows the view of the slot 13*k* along II—II line.

The substrate 13 mounts the light-emitting device 15*a*, the light receiving device 15*b*, the optical fiber 16 and the ferrule 18 thereon. The ferrule 18 protects the fiber 16, which is set within the slot 13*k*. The light-emitting device 15*a* is optically coupled to one tip of the fiber. Another tip of the fiber is exposed on the one facet of the ferrule. The supplementary member 20 fixes the fiber to the substrate. Thus the position of the fiber is defined.

From the invention thus described, it will be obvious that the invention may be varied in many ways. Although the resin-molded housing is described, other types of housing are also applicable. Similarly, the configuration of the lead frame, the container and so on are not restricted to embodiments disclosed in the specification. Such variations are not to be regarded as a departure from the spirit and scope of the invention, and all such modifications as would be obvious to one skilled in the art are intended for inclusion within the scope of the following claims.

We claim:

1. An optical communication module comprising:

a container;

a lead frame fixed to said container and having a primary surface;

a subassembly having a semiconductor optical device, an optical fiber coupled to said semiconductor device, and a ferrule for securing said optical fiber;

a base member fixed to said container for adjusting a position of said subassembly; and a resin molded housing for containing said container, said lead frame, said subassembly, and said base member, wherein an optical axis of said optical fiber is set substantially within said primary surface of said lead frame; and wherein said ferrule and said lead frame protrude from said housing.

2. The module according to the claim 1, wherein said container contains a pair of side portion extending along a first direction and a rear portion extending along a second direction intersecting the first direction, said rear portion providing a device-mounted area thereon.

3. The module according to the claim 2, wherein said container has a first surface and a second surface opposing to each other, said lead frame being fixed to said first surface and said base member fixed to said second surface, said side portions of said container and said base member form a room for securing said subassembly therein.

4. The module according to the claim 3, wherein said container further includes a plurality of first regions for fixing said lead frame, said first regions being provided on said first surface of respective side portions, and a plurality of second regions for fixing said base member, said second regions being provided on said second surface opposing to said first surface.

5. The module according to the claim 1, wherein said base member comprises a pair of frame portion extending along said first direction within a primary surface and opposing to said container;

an island portion between said respective frame portions within said primary surface, said island portion holding said subassembly thereon; and a plurality of supporting portion connecting said respective frame portions and said island portion, wherein said supporting portions has flexibility.

6. The optical module according to the claim 5, wherein said plurality of supporting portion has at least a portion, a thickness of said at least portion being thinner than a thickness of said island portion.

7. The module according to the claim 1, wherein said base member comprises a pair of frame portion extending along said first direction within a primary surface and opposing to said second regions in said container;

an island portion between said respective frame portions within said primary surface, said subassembly holding said subassembly thereon; and a plurality of supporting portion connecting said respective frame portions and said island portion so as to displace said island portion.

8. The optical module according to the claim 7, wherein said island support portions have at least a portion, a thickness of said at least portion being thinner than a thickness of said island portion.

9. The module according to the claim 1, wherein said lead frame comprises a pair of fixing bar for fixing said container thereto, and a plurality of leads, one of said fixing bar facing to tips of said leads.

10. The optical module according to the claim 1, wherein said optical device is a light-emitting semiconductor device.

11. The optical module according to the claim 1, wherein said optical device is a light-receiving semiconductor device.

12. The optical module according to the claim 1, wherein said container is made of metal.

* * * * *